United States Patent
Mishra et al.

(10) Patent No.: US 12,373,365 B1
(45) Date of Patent: Jul. 29, 2025

(54) BUS INTERRUPT DEBOUNCE ON A ONE-WIRE BIDIRECTIONAL BUS

(71) Applicant: QUALCOMM Incorporated, San Diego, CA (US)

(72) Inventors: Lalan Jee Mishra, Escondido, CA (US); Umesh Srikantiah, San Diego, CA (US); Ryan Scott Castro Spring, San Diego, CA (US); Richard Dominic Wietfeldt, San Diego, CA (US); Jia Fu Cen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 18/623,802

(22) Filed: Apr. 1, 2024

(51) Int. Cl.
*G06F 13/24* (2006.01)
*G06F 13/42* (2006.01)

(52) U.S. Cl.
CPC .......... *G06F 13/24* (2013.01); *G06F 13/4295* (2013.01)

(58) Field of Classification Search
CPC ... G06F 13/24; G06F 13/4291; G06F 13/4295
See application file for complete search history.

(56) References Cited

U.S. PATENT DOCUMENTS

| | | | | |
|---|---|---|---|---|
| 5,564,060 A | * | 10/1996 | Mahalingaiah | G06F 15/17 710/264 |
| 5,634,130 A | * | 5/1997 | Lee | G06F 9/4812 710/268 |
| 2014/0108691 A1 | * | 4/2014 | Kennedy | G06F 9/4812 710/269 |
| 2014/0317327 A1 | * | 10/2014 | Ravirala | H03K 5/1254 710/262 |
| 2016/0246739 A1 | * | 8/2016 | Tsirkin | G06F 13/4221 |
| 2024/0241853 A1 | * | 7/2024 | Mishra | G06F 13/24 |

* cited by examiner

*Primary Examiner* — Phong H Dang
(74) *Attorney, Agent, or Firm* — Loza & Loza, LLP/Qualcomm

(57) ABSTRACT

Bus interrupt debounce is described for in band bus interrupts on a one-wire serial bus between a host device and one or more subordinate devices. The host device includes a line driver configured to couple the host device to a one-wire serial bus and a controller. The controller is configured to receive an interrupt request on the one-wire serial bus from a subordinate device coupled to the one-wire serial bus, drive a first sequence of challenge pulses on the one-wire serial bus, receive a second sequence of challenge responses from the subordinate device on the one-wire serial bus in response to the challenge pulses, accept the interrupt request in response to receiving the second sequence of challenge responses, and start an interrupt arbitration for the one-wire serial bus in response to accepting the interrupt request.

20 Claims, 12 Drawing Sheets

BUS INTERRUPT DEBOUNCE ON A ONE-WIRE BIDIRECTIONAL BUS

TECHNICAL FIELD

Aspects of the present disclosure relate generally to bus interrupts on a one-wire bidirectional bus and, in particular, to debouncing in-band bus interrupts.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus is operated in accordance with an Inter-Integrated Circuit (I2C bus or I²C) protocol. The I2C bus was developed to connect low-speed peripherals to a processor, where the I2C bus is configured as a multi-drop bus. In another example, the Improved Inter-Integrated Circuit (I3C) protocols defined by the Mobile Industry Processor Interface (MIPI) Alliance derive certain implementation aspects from the I2C protocol including separate clock and data lines.

In another example, the Radio Frequency Front-End (RFFE) interface defined by the MIPI Alliance provides a communication interface for controlling various radio frequency (RF) front-end devices, including power amplifiers (PAs), low-noise amplifiers (LNAs), antenna tuners, filters, sensors, power management devices, switches, etc. These devices may be collocated in a single integrated circuit (IC) device or provided in multiple IC devices. In a mobile communication device, multiple antennas and radio transceivers may support multiple concurrent RF links.

In another example, the system power management interface (SPMI) defined by the MIPI Alliance provides a hardware interface that may be implemented between baseband or application processors and peripheral components. In some implementations, the SPMI is deployed to support power management operations within a device.

The use of MIPI-defined serial buses in place of parallel buses can reduce the number of general-purpose input/output (GPIO) physical pins required to support communication between multiple devices. As device complexity increases, demand for GPIO pins also increases and there is continual demand for simplified bus architectures.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, a host device is configured for data communication. The host device a line driver configured to couple the host device to a one-wire serial bus and a controller. The controller is configured to receive an interrupt request on the one-wire serial bus from a subordinate device of one or more subordinate devices coupled to the one-wire serial bus, drive a first sequence of challenge pulses on the one-wire serial bus, receive a second sequence of challenge responses from the subordinate device on the one-wire serial bus in response to the challenge pulses, accept the interrupt request in response to receiving the second sequence of challenge responses, and start an interrupt arbitration for the one-wire serial bus in response to accepting the interrupt request In another example, a method of data communication performed at a host device, includes receiving an interrupt request on a one-wire serial bus from a subordinate device of one or more subordinate devices coupled to the one-wire serial bus, driving a first sequence of challenge pulses on the one-wire serial bus, receiving a second sequence of challenge responses from the subordinate device on the one-wire serial bus in response to the challenge pulses, accepting the interrupt request in response to receiving the second sequence of challenge responses, and starting an interrupt arbitration for the one-wire serial bus in response to accepting the interrupt request.

In another example, a subordinate device is configured for data communication. The subordinate device includes a line driver configured to couple the subordinate device to a one-wire serial bus, the one-wire serial bus coupled to a host device and one or more other subordinate devices and a controller. The controller is configured to transmit an interrupt request on the one-wire serial bus from the subordinate device, receive a first sequence of challenge pulses on the one-wire serial bus, transmit a second sequence of challenge responses from the subordinate device on the one-wire serial bus in response to the challenge pulses, and start an interrupt arbitration for the one-wire serial bus in response to transmitting the second sequence of challenge responses.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
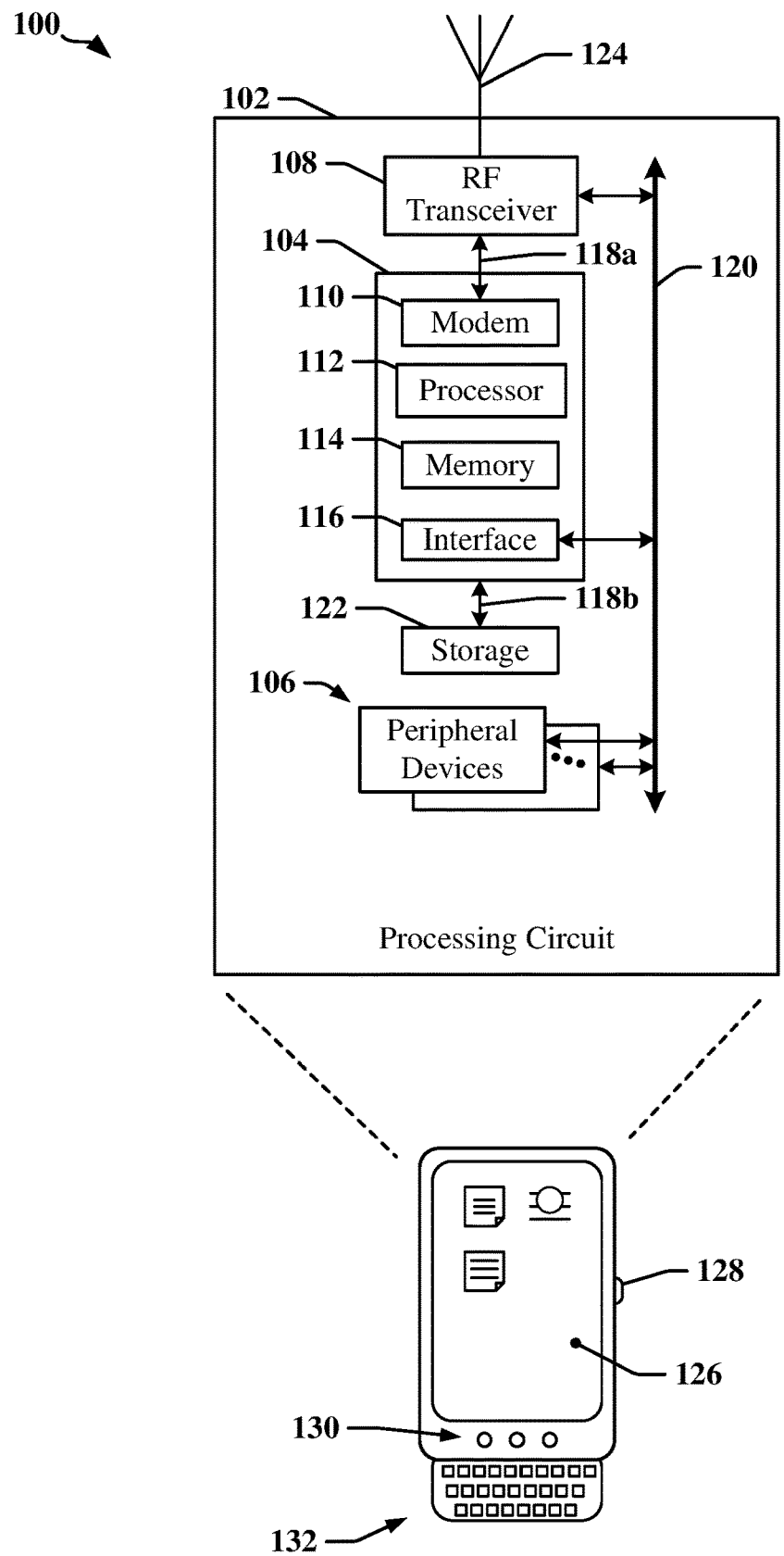
FIG. 1 illustrates an example of an apparatus that employs a one-wire serial bus for data communication according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to serial bus configurations in which multiple devices can communicate at various times. The described serial buses are typically operated in a hierarchical manner, in that one device controls communication during a transaction. The controlling device may be referred to as a bus owner master (BOM), a host device, a bus master device, a managing device, or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. During certain transactions, a controlling device may transmit commands directed to one or more receiving devices using address information provided in or with the commands. The receiving devices may be referred to as a subordinate device, a client device, a slave device, a peripheral device, or another term favored by standards defining the protocols implemented by the controlling device. For the purposes of this disclosure, a controlling device will be referred to as a host device and associated receiving devices will be referred to as subordinate devices.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on GPIO pins and communication link throughput.

On a one-wire serial bus, particularly a multidrop serial bus, in-band bus interrupts may be detected in response to spurious noise or interference on the bus. By debouncing bus interrupts, spurious interrupts may be distinguished from interrupts received from other devices on the bus.

Certain aspects of the disclosure relate to techniques for communication over a one-wire serial bus. In some implementations, Manchester encoding and synchronization signaling enable receiving devices to synchronize clock signals generated in a device that is currently transmitting over the one-wire serial bus. In one aspect, subordinate devices may assert responses to interrupt challenges by initiating a bus pull-up during an interrupt request window and while the one-wire serial bus is idle. The host may challenge the asserted interrupt request through multiple clock cycles before beginning an interrupt arbitration for use of the bus. Arbitration may be configured to enable the host device to identify subordinate devices asserting an interrupt request. In another aspect a host device may be adapted to format datagrams in accordance with RFFE or SPMI protocols.

In one example, a host device may initiate a challenge-response window using a synchronization pull-down challenge and wait for a pull-up response over several repetitions. An interrupt debounce procedure through multiple synchronization pulses may be followed by an interrupt arbitration followed by an encoded first value to initiate a read transaction or a write transaction with one or more of the subordinate devices when the plurality of synchronization pulses is encoded with a second value. The synchronization pulses may be encoded using Manchester encoding.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode. Certain aspects are applicable to point-to-point Universal Asynchronous Receiver/Transmitter (UART) interfaces, Line-Multiplexed UART (LM-UART) interfaces, or another type of point-to-point interface. In some implementations, certain aspects disclosed herein may be deployed to support exchange of virtual GPIO (VGI) messages, which can be used to communicate the state or change in state of physical GPIO pins without physical connections between devices. Certain aspects are applicable to multipoint interfaces, point-to-point interfaces, or interfaces switchable between point-to-point and multipoint modes.

Examples of Apparatus that Employ a One-Wire Serial Bus

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices, which may be implemented in one or more Application Specific Integrated Circuits (ASICs) or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable peripheral devices to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
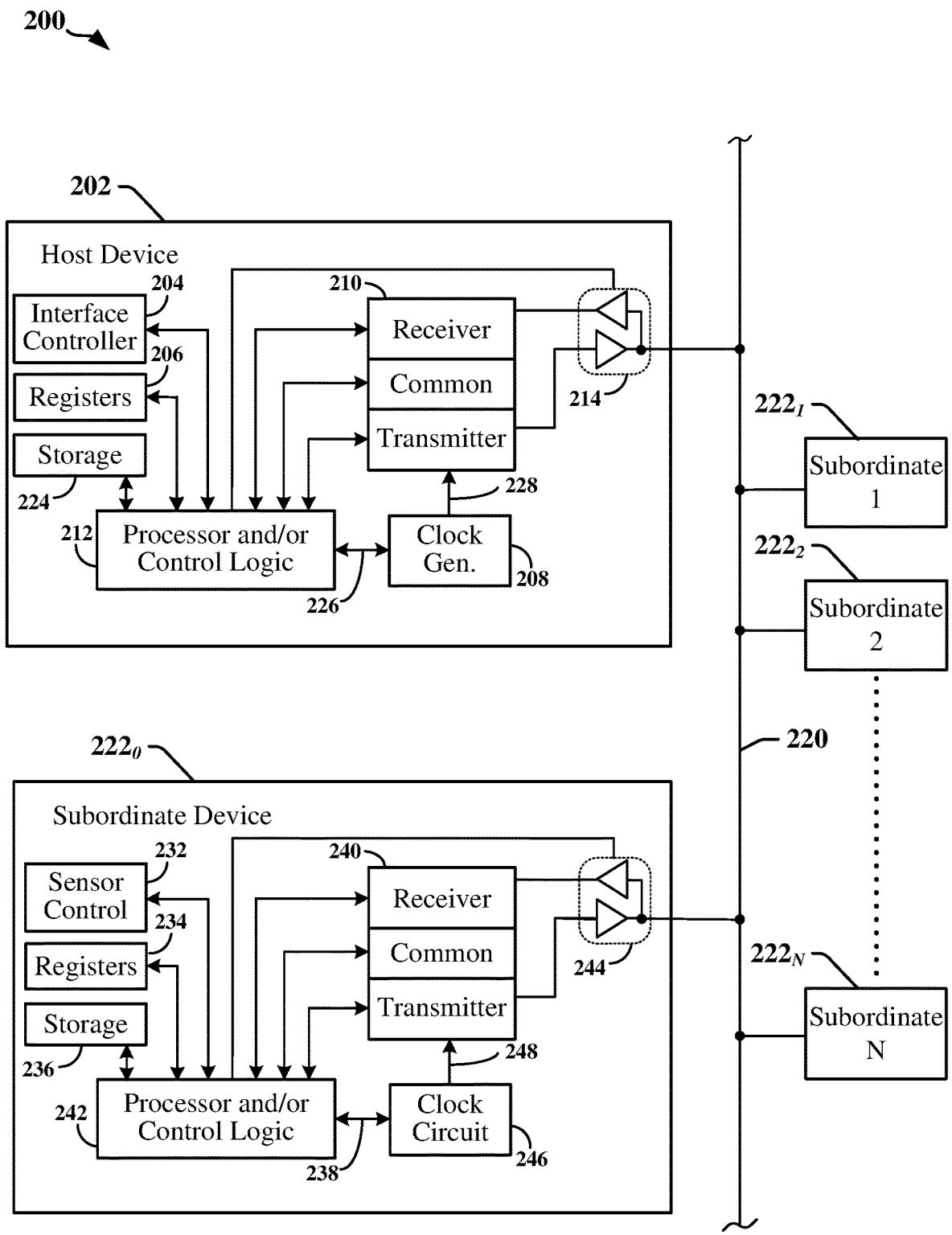
FIG. 2 illustrates an example of multiple devices employing a one-wire serial bus for data communication according to aspects of the present disclosure.

FIG. 2 illustrates a first example of an apparatus 200 employing a data link that may be used to communicatively couple two or more devices. Here, the apparatus 200 includes multiple devices 222₀-222N coupled to a one-wire serial bus 220. The devices 222₀-222N may be implemented in one or more semiconductor IC devices, such as an application processor, SoC or ASIC. In various implementations, certain of the devices 222₀-222N may include, support, or operate as a modem, a signal processing device, a display driver, a camera, a user interface, a sensor, a sensor controller, a media player, a transceiver, and/or other such components or devices. In some examples, one or more devices 222₀-222N may be used to control, manage, or monitor a sensor device. Communication between devices 222₀-222N over the one-wire serial bus 220 is controlled by a host device 202. Certain types of bus can support multiple host devices 202.

In one example, a host device 202 may include an interface controller 204 that may manage access to the one-wire serial bus 220 and configure dynamic addresses for subordinate devices. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214. The transceiver 210 may include a receiver, transmitter, and common circuits, where the common circuits may include timing, logic, and storage circuits and/or devices. In one example, the transmitter encodes and transmits data based on timing in a clock signal 228 provided by a clock generation circuit 208. Other timing clocks 226 may be used by the control logic 212 and other functions, circuits, or modules.

One or more devices 222₀-222N may be configured to operate as a subordinate device. In some examples, a subordinate device may include circuits and modules that support a display, an image sensor, and/or circuits and modules that control and communicate with one or more sensors that measure environmental conditions. In one example, a device 222₀ configured to operate as a subordinate device may provide a control function, module, or circuit 232 that includes circuits and modules to support a display, an image sensor, and/or circuits and modules that control and communicate with one or more sensors that measure environmental conditions. In this example, the device 222₀ can include configuration registers 234 or other storage 236, control logic 242, a transceiver 240 and line drivers/receivers 244. The control logic 242 may include a processing circuit such as a state machine, sequencer, signal processor or general-purpose processor. The transceiver 240 may include receiver, transmitter, and common circuits, where the common circuits may include timing, logic, and storage circuits and/or devices. In one example, the transmitter encodes and transmits data based on timing in a clock signal 248 provided by clock generation and/or recovery circuits 246. In some instances, the clock signal 248 may be derived from a signal received from an external clock line (not shown). Other timing clocks 238 may be used by the control logic 242 and other functions, circuits, or modules.

The one-wire serial bus 220 may be operated in accordance with RFFE, I2C, I3C, SPMI, or other protocols. At least one of the devices 222₀-222N may be configured to operate as a host device and a subordinate device on the one-wire serial bus 220. Two or more of the devices 2220-222N may be configured to operate as a host device on the one-wire serial bus 220. The protocol selected to control operation of the one-wire serial bus 220 may define direct current (DC) characteristics affecting certain signal levels associated with the one-wire serial bus 220, and/or alternating current (AC) characteristics affecting certain timing aspects of signals transmitted on the one-wire serial bus 220.

Figure 3:
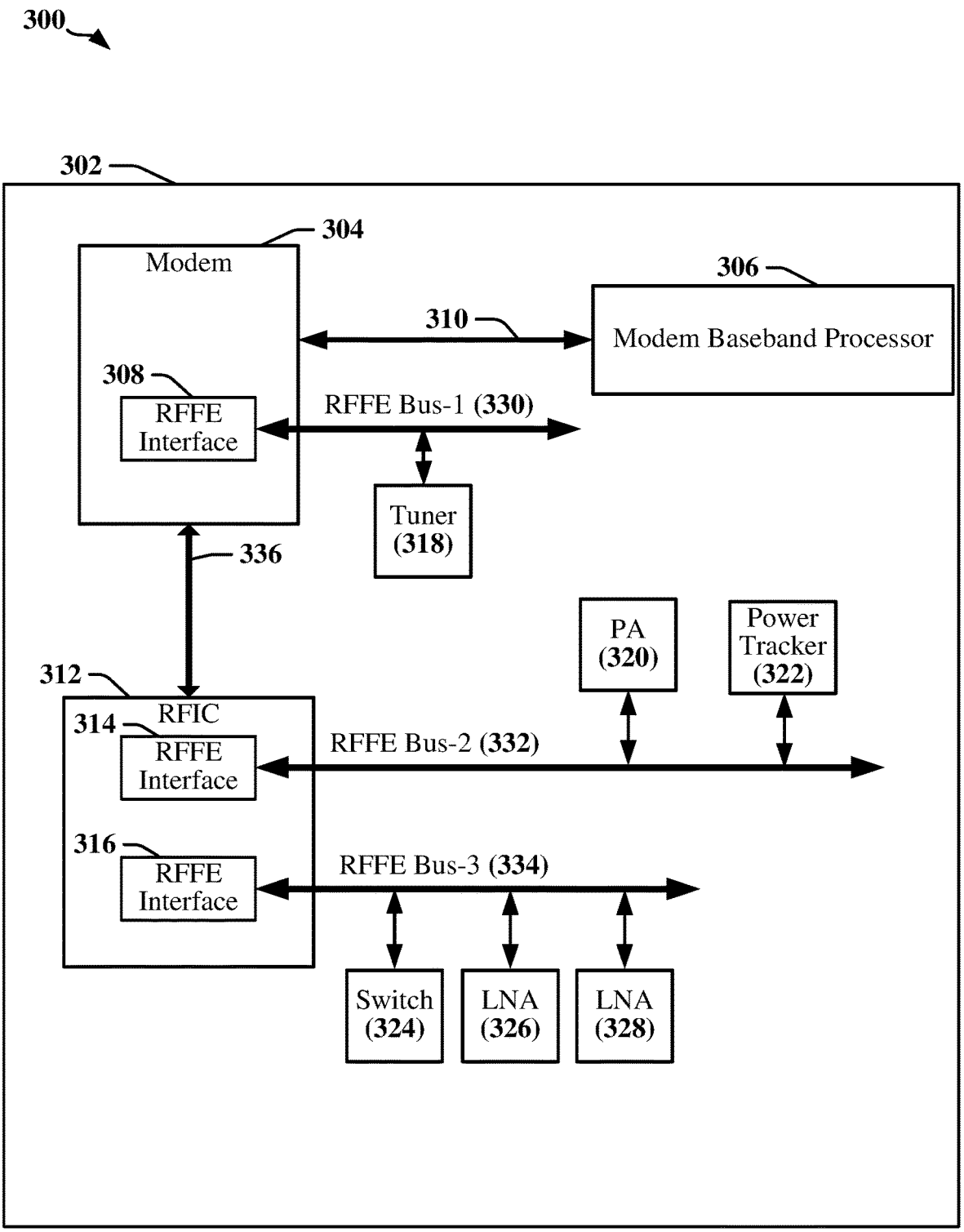
FIG. 3 illustrates an example of an apparatus with multiple devices employing a one-wire serial bus for data communication according to aspects of the present disclosure.

FIG. 3 illustrates a second example of an apparatus 300 employing data links that may be used to communicatively couple two or more devices. In this example, a chipset or device 302 employs multiple RFFE buses 330, 332, 334 to couple various RF front-end devices. A modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The device 302 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and a second RFFE bus 332. The RFIC 312 may communicate with a switch 324 and one or more LNAs 326, 328 through a second of its RFFE interfaces 316 and a third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of devices that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Figure 4:
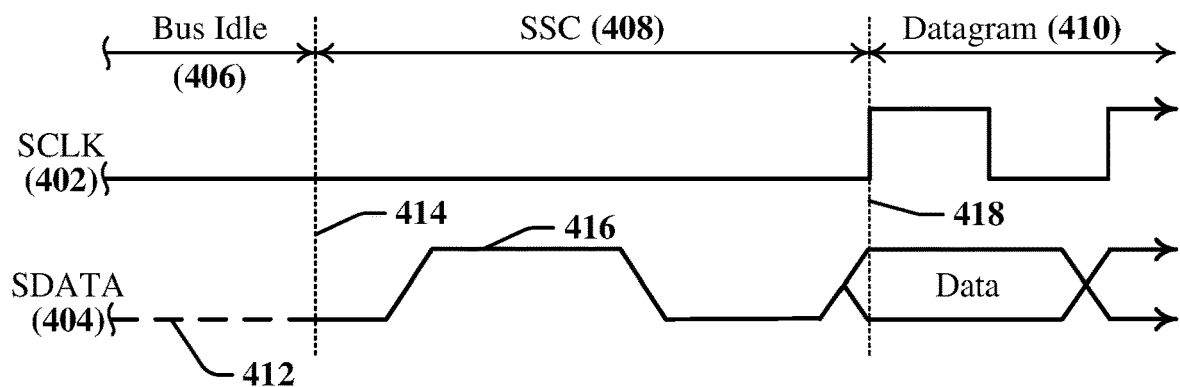
FIG. 4 includes timing diagrams that illustrate signaling transmitted to delineate the boundaries of RFFE and SPMI datagrams.
Figure 4:
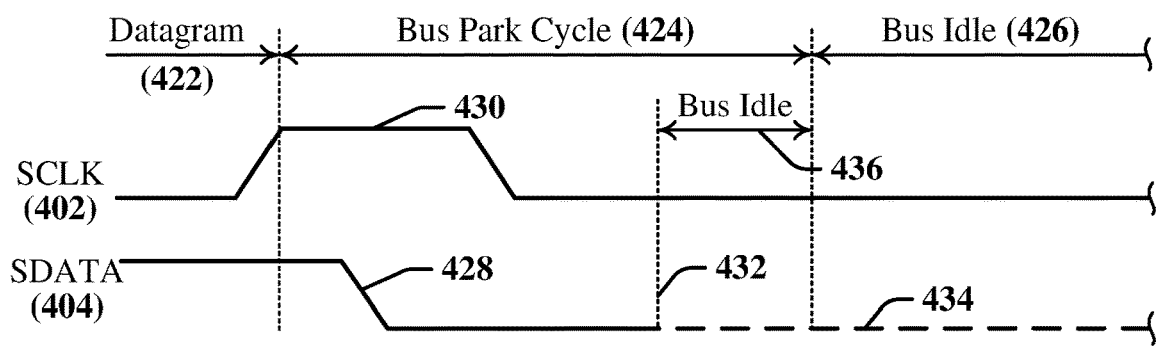

FIG. 4 includes timing diagrams 400, 420 that illustrate signaling that is transmitted to delineate the boundaries of datagrams transmitted in accordance with RFFE protocols. The timing diagrams 400, 420 show the relative timing of signals transmitted on a 2-wire serial bus that provides a clock signal on SCLK 402 and provides for exchange of data over SDATA 404. The first timing diagram 400 illustrates timing of a sequence start condition (SSC) 408 that is transmitted to signal the start of a transaction such as the transmission of a datagram 410. The SSC 408 is transmitted when the serial bus is in an idle state 406. In the idle state 406, SCLK 402 is driven at full strength by a host while subordinate devices coupled to the serial bus present a high impedance to SCLK 402. SCLK 402 is held in the low signaling state (here, at zero volts) by the host. In the idle state 406, SDATA 404 is weakly driven by the host or is held in the weakly driven low signaling state 412 using a keeper circuit or a weak pull-down circuit. A keeper circuit or a weak pull-down circuit may maintain the signaling state of SDATA 404, for example, when the host has caused its line driver to enter a high impedance state and when no other device is driving SDATA 404. The weakly driven low signaling state 412 can easily be overcome by another line driver that can drive SDATA 404 at full strength.

In a host-driven SSC 408, the host commences transmission of the SSC 408 at a first point in time 414 when it begins to drive SDATA 404 at full strength, initially at the low signaling state. The host then provides a pulse 416 on SDATA 404 while continuing to drive SCLK 402 to the low signaling state. The pulse 416 has duration of at least one cycle of a clock signal provided on SCLK 402 during transmission of a datagram 410. At a second point in time 418, the host commences transmission of clock pulses on SCLK 402, thereby providing the clock signal used to control or indicate timing of a datagram 410 transmitted on SDATA 404.

The second timing diagram 420 illustrates timing of a bus park cycle (BPC) 424 that may be transmitted to signal the termination of a datagram 422, for example. The BPC 424 is transmitted by providing a falling edge 428 on SDATA 404 while SCLK 402 is in a high signaling state 430. By protocol, transitions on SDATA 404 during transmission of the datagram 422 are permitted only while the clock signal is in the low signaling state, and the falling edge 428 that occurs while SCLK 402 is in the high signaling state 430 is interpreted as control signaling (i.e., the BPC 424). The falling edge 428 is provided by the host driving SDATA 404 low at full strength. The host then drives SCLK 402 low and continues to drive SCLK 402 at full strength through subsequent bus idle intervals 426, 436. After driving SCLK 402 low, the host initiates a bus idle interval 436 at a time 432 when the host causes its line driver to enter the high impedance state. While no other device is driving SDATA 404, SDATA 404 remains in the weakly driven low signaling state 434. The BPC 424 is terminated, and the serial bus enters a bus idle interval 426 until the next datagram is ready for transmission.

Figure 5:
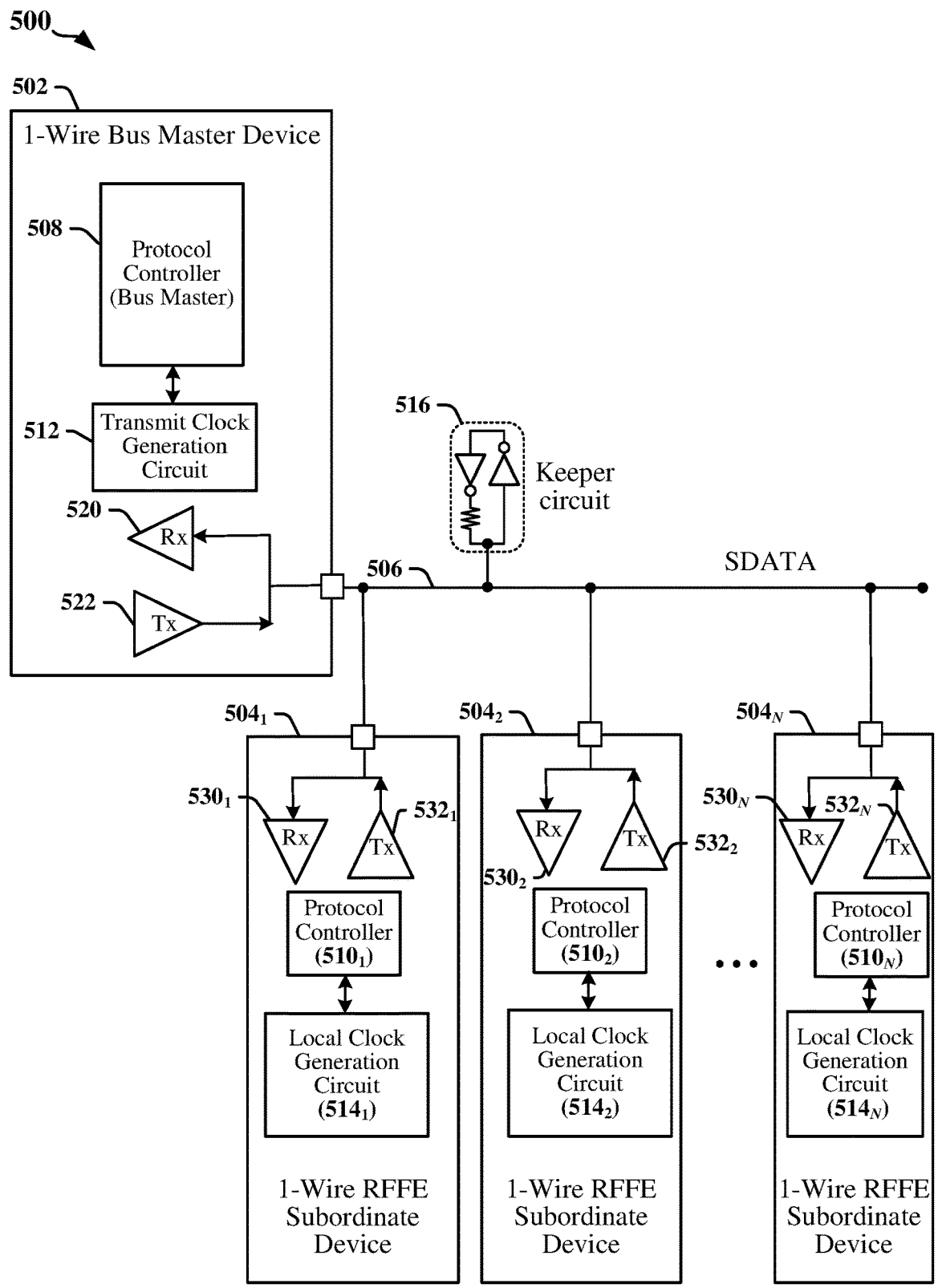
FIG. 5 illustrates a system in which a host device communicates with one or more one-wire subordinate devices according to aspects of the present disclosure.

FIG. 5 illustrates a system 500 in which a host device 502 communicates with one or more one-wire subordinate devices 5041-504N in accordance with certain aspects disclosed herein. The host device 502 may be provided in an RFIC, modem, application processor or another type of device. The host device 502 may be adapted to exchange data with the one-wire subordinate devices $504_1$-$504_N$ over a single wire, the one-wire serial bus, referred to as the SDATA line 506 in the illustrated system 500. Data is encoded in a signal transmitted over the SDATA line 506, where the signal includes embedded clock information that can be used by the receiving device to decode data from the signal.

The host device 502 and the one-wire subordinate devices $504_1$-$504_N$ typically include respective protocol controllers 508, $510_1$-$510_N$. The protocol controllers 508, $510_1$-$510_N$ may have a processor, controller, state machine or other logic circuits configured to support one or more protocols. The protocol controller 508 in the host device 502 may be further configured to manage communication over the SDATA line 506. In some instances, the protocol controller 508 performs some of the functions of a host. In some implementations, the protocol controller 508 in the host device 502 may be used to configure one or more of the one-wire subordinate devices $510_1$-$510_N$. The host device 502 may determine a configuration of a one-wire subordinate device $504_1$-$504_N$ that is a designated recipient of data to be transmitted over the SDATA line 506 and may cause the protocol controller 508 to encode data intended for the recipient one-wire subordinate device $504_1$-$504_N$ in a signal to be transmitted over the SDATA line 506 and addressed to the one-wire subordinate device $504_1$-$504_N$.

The host device 502 may include a transmit clock generation circuit 512 that can be used to define timing for transmissions over the SDATA line 506. Each of the one-wire subordinate devices $504_1$-$504_N$ includes a local clock generation circuit $514_1$-$514_N$ that provides timing for the corresponding protocol controller $510_1$-$510_N$. The local clock generation circuits $514_1$-$514_N$ may be synchronized using synchronization pulses transmitted by the host device 502 after an SSC or transmitted by the host device 502 or by one of the one-wire subordinate devices $504_1$-$504_N$ after a line turnaround.

A keeper circuit 516 may be coupled to the SDATA line 506 to facilitate line turnaround, in-band interrupt requests or arbitration procedures in accordance with certain aspects disclosed herein. In one example, the keeper circuit 516 may be configured as a positive feedback circuit that drives the SDATA line 506 through a high impedance output and receives feedback from the SDATA line 506 through a low impedance input. The keeper circuit 516 may be configured to maintain the last asserted voltage on the SDATA line 506. The keeper circuit 516 can be easily overcome by an active line driver in the host device 502 or in one of the one-wire subordinate devices $504_1$-$504_N$.

The protocol controller 508 may be configured to manage and control the operation of a line driver 522 and a line receiver 520. The protocol controller $510_1$-$510_N$ may be configured to manage and control the operation of a line driver $532_1$-$532_N$ and a line receiver $530_1$-$530_N$. The line drivers 520, $532_1$-$532_N$ may present a high impedance to the SDATA line 506 when inactivated or disabled. For example, the output of the line driver 520 in the host device 502 may present a high impedance to the SDATA line 506 when the one-wire subordinate device $504_N$ is configured or expected to transmit data or control signals over the SDATA line 506. The output of the line driver $532_N$ in the one-wire subordinate device $504_N$ is typically in the high impedance state when the host device 502 is driving the SDATA line 506.

Figure 6:
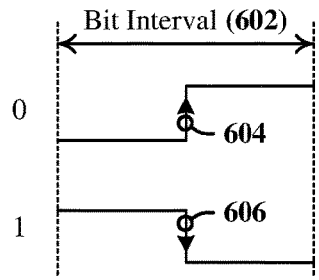
FIG. 6 illustrates certain aspects of Manchester encoding and control signaling that may be used to exchange data between a host device and one-wire subordinate devices in accordance with certain aspects of the present disclosure.
Figure 6:
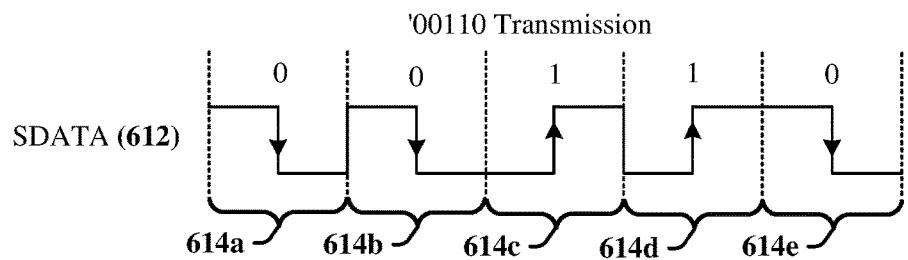
Figure 6:
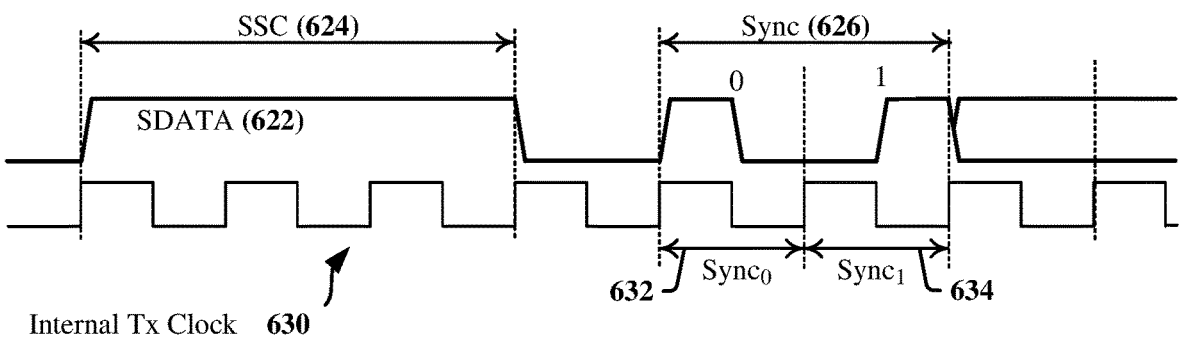

FIG. 6 illustrates certain aspects of Manchester encoding and the control signaling that may be used to exchange data over a one-wire serial bus between the host device and the one-wire subordinate devices in accordance with certain aspects of this disclosure. The signal wire of the one-wire serial bus is referred to as SDATA 622 herein (cf. FIGS. 5 and 6). With reference to the first timing diagram 600, Manchester encoding encodes data based on the direction of a transition occurring in the middle of a bit transmission interval 602. In some implementations, SDATA 622 may be in a low state initially and a transition 604 to the high state indicates a '1' value bit. SDATA 622 may initially be in a high state and a transition 606 to the low state indicates a '0' value bit. In other implementations, SDATA 622 may be in a low state initially and a transition 604 to the high state indicates a '0' value bit. SDATA 622 may initially be in a high state and a transition 606 to the low state indicates a '1' value bit. Clock information is embedded in the transitions of the data signal that occur within every bit transmission interval 602. Certain examples illustrated in this disclosure are based on implementations in which a transition 604 to the high state indicates a '1' value bit and a transition 606 to the low state indicates a '0' value bit.

The second timing diagram 610 illustrates five bit transmission intervals 614a-714e in a signal carried on SDATA 612. A sequence of bits {0, 0, 1, 1, 0} is transmitted in the five bit transmission intervals 614a-714e and illustrates the transitions within each of the five bit transmission intervals 614a-714e. It will be observed that transitions may occur at some boundaries between bit transmission intervals 614a-714e and that no transitions occur at the other boundaries between bit transmission intervals 614a-714e.

Control signaling provided in accordance with certain aspects of this disclosure can be used to indicate start of a datagram, clock synchronization, commencement of data exchange for both write and read datagrams and end of a datagram. Certain aspects of this disclosure relate to the generation and handling of in-band interrupt requests. In-band interrupt requests are accommodated under the control of a host device. The host device may defer, reject or ignore in-band interrupt requests, including when, for example, higher priority messages arrive for transmission over the one-wire serial bus controlled by the host device.

The third timing diagram 620 illustrates configuration of an SSC 624, and a synchronization pattern (Sync 626) defined for basic transactions in accordance with certain aspects of this disclosure. The SSC 624 operates as a control signal that is transmitted over SDATA 622 to signal the start of a transaction or an interrupt handling procedure. The SSC 624 has the form of a pulse that is initiated when SDATA 622 is idle. In the illustrated example, SDATA 622 is in a low signaling state when idle. The SSC 624 is initiated by driving SDATA 622 to a high signaling state. The SSC 624 is terminated by driving SDATA 622 to the low signaling state. In the illustrated example, the SSC 624 has a duration of three cycles of an internal transmit clock signal 630 used by the host device to control timing of transmissions over the one-wire serial bus.

In some implementations, the SSC 624 is separated from Sync 626 by a duration corresponding to one cycle of the internal transmit clock signal 630. Sync 626 has a duration defined by a number of cycles of the internal transmit clock signal 630. In the illustrated example, Sync 626 has a duration corresponding to two cycles of the internal transmit clock signal 630. Other implementations may specify a synchronization pattern that is defined by any number of cycles of the internal transmit clock signal 630, or by a minimum and/or a maximum number of cycles of the internal transmit clock signal 630.

Figure 7:
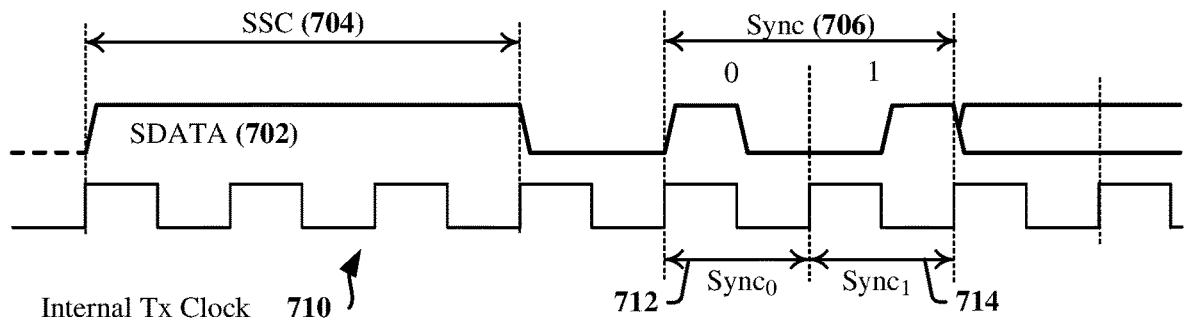
FIG. 7 illustrates examples of transaction initiation for a one-wire serial bus in accordance with certain aspects of the present disclosure.
Figure 7:
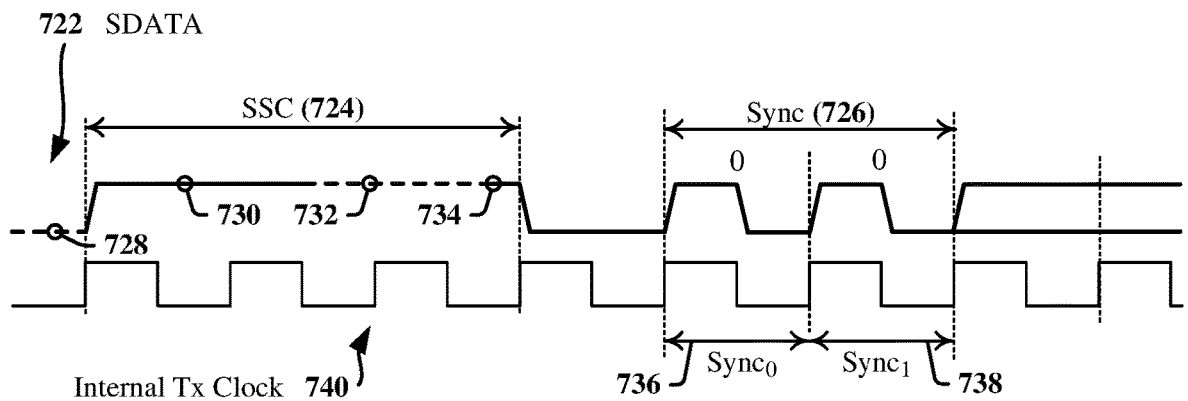

FIG. 7 illustrates initiation of transactions over a one-wire serial bus that is configured for exception handling prompted by an in-band interrupt asserted in accordance with certain aspects of this disclosure. A first timing diagram 700 in FIG. 7 shows an example of an SSC 704 and Sync 706 that is configured to indicate a normal or standard datagram. The SSC 704 is transmitted over SDATA 702 to signal the start of a normal or standard transaction. The SSC 704 is initiated by the host device when SDATA 702 is idle. In the illustrated example, SDATA 702 is in a low signaling state when idled and the SSC 704 is initiated when the host device drives SDATA 702 to a high signaling state. The SSC 704 is terminated when the host device drives SDATA 702 to the low signaling state. In the illustrated example, the SSC 704 has a duration of three cycles of an internal transmit clock signal 710 used by the host device to control timing of transmissions over the one-wire serial bus and is separated from Sync 706 by a duration corresponding to one cycle of the internal transmit clock signal 710.

Sync 706 has a duration that may be expressed as a number of cycles of the internal transmit clock signal 710. In the illustrated example, Sync 706 has a duration corresponding to two cycles of the internal transmit clock signal 710. Other implementations may specify a synchronization pattern that is defined by any number of cycles of the internal transmit clock signal 710, or by a minimum and/or a maximum number of cycles of the internal transmit clock signal 710. The duration of Sync 706 is typically selected to ensure that clock generation circuits in receiving devices can synchronize with the internal transmit clock signal 710 used by the host device.

In the illustrated example, Sync 706 is transmitted as two Manchester-encoded bits 712, 714 and has the combined value '01' to indicate that the Sync 706 precedes a normal or standard datagram. A normal or standard datagram may refer to a datagram that is initiated under the control of the host device. A normal or standard datagram may include a command addressed to a single subordinate device or a group of subordinate devices, or is a broadcast command to all subordinate devices. The value encoded in a multibit synchronization pattern can be defined or preconfigured such that the host device can distinguish between types of transmissions. In one example, the value encoded in a multibit synchronization pattern and its meaning can be configured during manufacture, system configuration or by application.

The second timing diagram 720 in FIG. 7 shows an example of an SSC 724 and Sync 726 that is configured to indicate an exception transaction. In this example, the SSC 724 is transmitted over SDATA 722 to signal the start of an interrupt handling procedure. The SSC 724 is initiated when SDATA 722 is idle. As illustrated for this example, SDATA 722 is in a low signaling state when idled and the SSC 724 is initiated when SDATA 722 is driven to a high signaling state. The SSC 724 is terminated when the host device drives SDATA 722 to the low signaling state.

The SSC 724 illustrated in the second timing diagram 720 may be treated as an interrupt request. One or more subordinate devices may assert an interrupt request by driving SDATA 722 to the high signaling state. With renewed reference to FIG. 6, for example, When SDATA 722 is idled, the host device 602 may cause the output to enter a high-impedance state thereby causing the SDATA 620 to be weakly held low by the keeper circuit 640. The synchronization pulse 632 of the subordinate device 604N can easily drive the line to overcome the keeper circuit 640 and drive SDATA 620 high.

Returning to FIG. 7, the second timing diagram 720 may represent timing associated with the device configuration illustrated in FIG. 6. The host device may be configured to monitor SDATA 722 when SDATA 722 is in an idle state 728. The host device detects that at least one subordinate device has driven SDATA 722 to the high signaling state 730. Any subordinate device asserting an interrupt request is expected to maintain SDATA 722 to the high signaling state 730 a period of time that is defined during manufacture or configured by application to ensure sufficient time to detect of the interrupt request by the host device. In the illustrated example, the interrupt asserting subordinate device continues to drive SDATA 722 high for two cycles of an internal transmit clock signal before causing its line driver to enter a high impedance state. SDATA 722 remains in the high signaling state 732 based on the weak pull of the keeper circuit. The internal transmit clock signal may be used by the host device or subordinate device to control timing of transmissions over the one-wire serial bus. The host device and subordinate devices generate internal transmit clock signals that can be synchronized using timing provided by Manchester-encoded signals.

The host device may host device may cause the output its line driver to exit the high-impedance state and to actively maintain SDATA 722 at the high signaling state 734 before driving SDATA 722 to the low signaling state, thereby terminating the SSC 724. In the illustrated example, the SSC 724 has a duration corresponding to three cycles of the internal transmit clock signal, although the duration may be defined during manufacture or system configuration and/or selected according to application needs. In the illustrated example, the SSC 724 has a duration of three cycles of an internal transmit clock signal. After the SSC 724 has been terminated, all devices coupled to SDATA 722 interpret the transition as the start of a new datagram by the host device.

Sync 726 may follow SSC 724 after a configured or predefined delay. In the illustrated example, the delay corresponds to one cycle of the internal transmit clock signal 740. Sync 726 may have a duration that may be expressed as a number of cycles of the internal transmit clock signal 740. In the illustrated example, Sync 726 has a duration corresponding to two cycles of the internal transmit clock signal 740. Other implementations may specify a synchronization pattern that is defined by any number of cycles of the internal transmit clock signal 740, or by a minimum and/or a maximum number of cycles of the internal transmit clock signal 430. The duration of Sync 726 is typically selected to ensure that clock generation circuits in receiving devices can synchronize with the internal transmit clock signal 740 used by the host device.

In the illustrated example, Sync 726 is transmitted as two Manchester-encoded bits 736, 738 having the value '00' to indicate that the Sync 726 precedes an interrupt handling procedure. In another example, the host device may transmit a synchronization pattern as two Manchester-encoded bits having the value '01' to indicate that the synchronization pattern precedes a normal or standard datagram. In the latter example, the host device may handle interrupt requests through simple data exchange using a command code configured to initiate a read transaction or a write transaction of one or more subordinate devices. In some instances, the host device may transmit the '01' pattern when ignoring or deferring handling of the interrupt request.

The value encoded in a multibit synchronization pattern can be used by the host device to indicate different types of exception handling transactions, including hot join transactions used to assign addresses and/or priorities to subordinate devices, reset or error recovery procedures, and so on. In some instances, a multibit synchronization pattern may be assigned to indicate special transmissions of normal or standard datagrams without address to preconfigured priority target subordinate devices.

Certain aspects of this disclosure relate to interrupt request handling procedures as well as signaling and messaging formats and structures that can be used to identify subordinate devices that have requested interrupt service. In some implementations, address arbitration may be used to determine the highest priority subordinate device that is requesting interrupt service. In one example, each requesting subordinate device drives its unique device identifier (address) over the one-wire serial bus, such that the highest priority subordinate device wins arbitration based on the configuration of bits in its unique identifier. In some implementations, arbitration procedure based on a "hand-raising" mechanism is used to identify all subordinate devices that are currently requesting interrupt service.

In one example, each subordinate device coupled to the one-wire serial bus is assigned a slot within an arbitration period and can affirmatively signal a request for interrupt service during its assigned slot. The host device can identify and record each subordinate device requesting interrupt service and can service each requesting subordinate device in accordance with device priority, queuing algorithm or based on priorities and parameters defined by an application or system configuration. In some implementations, subordinate devices that are currently requesting interrupt service can be identified by interrogation whereby the host device polls each subordinate device to determine need for interrupt servicing. In one example, the host device may poll all devices and then determine an order of servicing in accordance with device priority, a queuing algorithm or based on priorities and parameters defined by an application or system configuration. In another example, the host device may poll devices in an order determined by device priority, queuing algorithm or based on priorities and parameters defined by an application or system configuration, and can then service interrupts as soon as a device indicates a need for servicing during polling.

The host device may also delay, defer, or abandon interrupt servicing at any time after detection of an interrupt request or during arbitration, polling, or servicing of interrupts. The host device can retain information subordinate devices requesting interrupt service after terminating interrupt-related procedures.

Bus Interrupt Debounce

Figure 8:
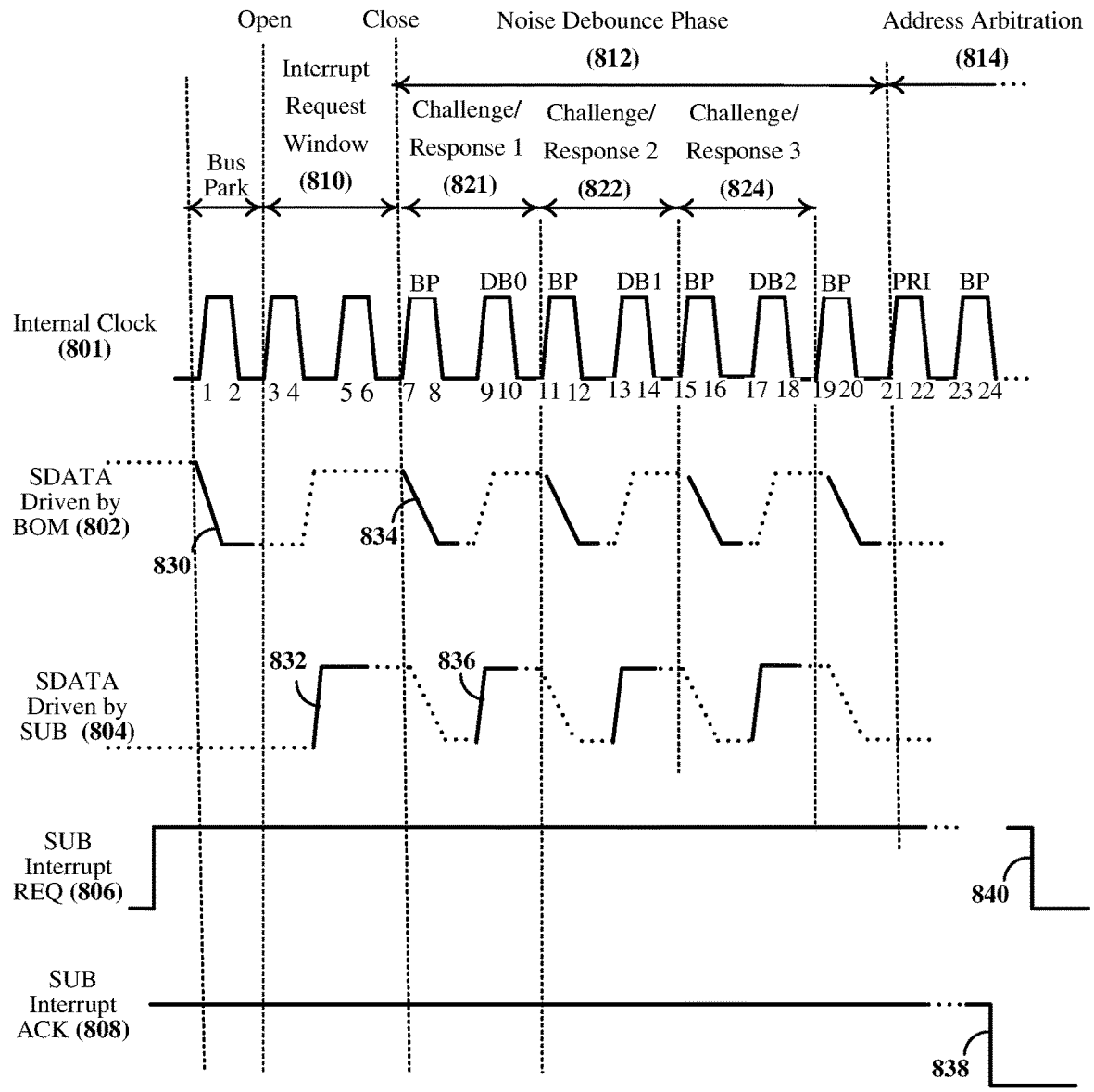
FIG. 8 illustrates a timing diagram for interrupt debounce by challenge/response conducted on a one-wire serial bus configured or adapted in accordance with certain aspects of the disclosure.

FIG. 8 illustrates a timing diagram 800 for initiation of transactions over a one-wire serial bus that is configured for interrupt noise debounce prompted by an in-band interrupt asserted in accordance with certain aspects of this disclosure. The timing diagram 800 shows events with respect to an internal clock 801. The rising edge of each clock pulse is identified with an odd number, e.g. 1, 3, 5, 6 . . . and the falling edge is identified with an even number, e.g., 2, 4, 6, 8 . . . . The interrupt debounce begins during a bus idle time with an interrupt request window 810 that opens with a first rising edge 3 of the clock pulse and closes with a second later rising edge 7. While the interrupt request window 810 is shown as having a duration of two clock pulses, it may be much longer, depending on bus demands and system configuration. If an interrupt request is detected during the interrupt request window, then a noise debounce phase 812 begins, with three challenge/responses 821, 822, 824. If the noise debounce phase 812 is successfully traversed, then an address arbitration 814 is begun as described above, which may be followed with data or other transactions on the one-wire serial bus (not shown) with the subordinate device that wins the address arbitration 814.

The one-wire serial bus is indicated as SDATA and is driven by the BOM or host device as well as by the subordinate (SUB) or subordinate device. SDATA driven by BOM 802 indicates how the host device drives the one-wire serial bus in solid line. Dotted line indicates the value on the bus when it is allowed to float or driven by another device, e.g. one or more subordinate devices, a keeper circuit, etc. SDATA driven by SUB 804 indicates how one subordinated devices drives the one-wire serial bus.

At a time before the timing diagram 800, a subordinate device receives an interrupt request 806 due to data in a queue or another internal event at the subordinate device. The subordinate device then monitors the one-wire serial bus and waits for an interrupt request window 810 to be opened. At some later time with rising edge 1, the host device performs a bus park by driving the one-wire serial bus low at 830 using a line interface transceiver and then allows the one-wire serial bus to float. With the interrupt request window 810 open at rising edge 3, adjacent to the bus park pulse, the subordinate device generates an interrupt request by driving the one-wire serial bus high at 832 using its line interface transceiver and holds the bus high for one or more clock pulses. This allows the host device to sample the one-wire serial bus and detect the interrupt request.

In the in-band signaling architecture, the subordinate device uses the bus-idle time after the bus park at 830 to interrupt the host device at 832 over the one-wire serial bus. The host device is monitoring the bus for any alarm condition that needs the host device's attention. In this example, the subordinate device drives the SDATA line to 1 at 832, which was otherwise at 0 by a weak drive from the host device. Since in the idle-state, the SDATA line is weakly driven to 0 by the host device, the one-wire serial bus is subject to interfering noise from other sources. Noise may be coupled to the one-wire serial bus from a poorly designed printed circuit board (PCB) from strong induction from the operation of nearby RF transmitters, and from other sources. This interfering noise has been observed to cause the spurious appearance of bus states that appear to be interrupts.

The host detects an interrupt by sampling the one-wire serial bus during the interrupt request window. If a spurious condition, and not a subordinate device, has driven SDATA high, then the host device could start an address arbitration for which there will be no subordinate address submitted. This requires time on the bus that might be better used in the idle state or in communication with other subordinate devices. If the spurious condition is sampled and interpreted as an interrupt request, then it will take most of an address arbitration to determine that there is no actual interrupt request. Valuable bus cycles are wasted.

Instead of moving to address arbitration 814, the host device interposes a noise debounce phase 812. The noise debounce phase has a sequence of challenge/responses 821, 822, 824, which include a first sequence of three challenge pulses on the one-wire serial bus. The sequence of challenge pulses is generated by the host device by driving the one-wire serial bus to a value, e.g., high or "1", at each of a sequence of recurring clock times and then releasing the one-wire serial bus after each challenge pulse. Each challenge pulse is answered with a respective challenge response of a second sequence of three challenge responses on the one-wire serial bus. The first challenge pulse is driven by the host device on SDATA at 834. In this example, the challenge pulse is driven at the rising edge 7 of a clock pulse after the interrupt request window 810 is closed. In aspects, there is no gap between the interrupt request window 810 close and the first challenge pulse at 834. In other aspects, the host device may wait one or more clock pulses before driving the first challenge pulse.

The subordinate device responds to the challenge pulse at 834 by driving a challenge response on SDATA at 836, e.g., the next clock pulse. In this example, the host device drives the bus low and releases the bus, then the subordinate device drives SDATA high before the next clock pulse rising edge 9. This is an interval on one clock pulse on the internal clock 801 following the recurring clock time 7 of the challenge pulse. The challenge pulses of the sequence are at times given by the rising edges 7, 11, and 15 and the challenge response are after an interval of one clock pulse, i.e. at the next clock pulse after the challenge pulse, in this example, at clock times 9, 13, 17. The host device is able to sample SDATA to detect the challenge response. In other aspects, the signals are reversed so that the host device drives the bus high, and the subordinate device drives the bus low. The challenge/response is repeated two more time in this example, so that there are three sequential challenge/response cycles within the noise debounce phase. The sequence of challenge pulses on SDATA driven by BOM are driven at each of a sequence of clock times here as 7, 11, and 15. In some aspects, there are two cycles, four cycles, or more cycles. The noise debounce phase 812 may be configured to different numbers of clock pulses or challenge/response cycles to suit the particular implementation by balancing bus utilization with spurious interrupt rejection.

The challenge/response cycles allow a valid interrupt request to pass to the stage of the address arbitration 814 and a spurious interrupt to get rejected. In the noise debounce phase, the host device challenges the subordinate devices to redrive the SDATA line in synchronization with the supplied clock ticks. Each challenge/response takes clock cycles, although other timings may be used. Due to the random nature of noise, the likelihood of starting an address arbitration in response to spurious noise becomes much less for each challenge. A noise spike that does not last more than two or three clock pulses will be rejected with complete certainty.

After receiving the second sequence of challenge responses from the subordinate device on the one-wire serial bus in response to the challenge pulses, the host device has confirmed that the initial interrupt request at 832 and sampled within the interrupt request window 810 is valid. The host device may then accept the interrupt request in response to receiving the second sequence of challenge pulses. However, the host device may still start an address arbitration 814 for the one-wire serial bus in response to accepting the interrupt request as valid. This determines which subordinate device has driven the interrupt request.

After the address arbitration has been completed, the subordinate device interrupt request can be acknowledged as indicated at 838 with an interrupt ACK 808. This ends the subordinate interrupt request 806 at 840 and the subordinate device may transmit data on the one-wire serial bus as described above.

Figure 9:
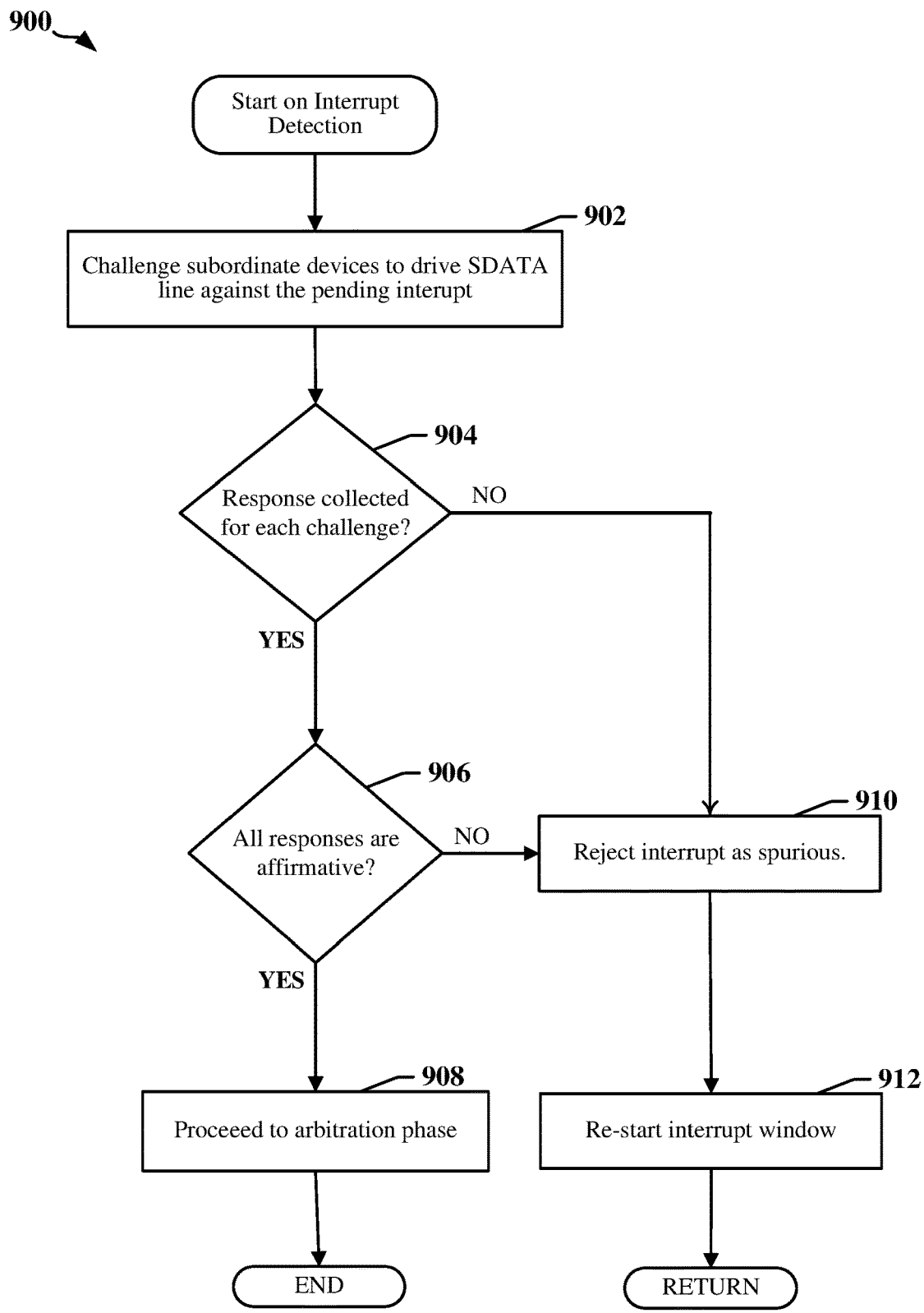
FIG. 9 is a first flowchart that illustrates general operation of a method for bus interrupt debounce using challenges and responses in accordance with certain aspects disclosed herein.

FIG. 9 is a flowchart 900 of a method of data communication that may be performed at a host device coupled to a one-wire serial bus. One or more subordinate devices may also be coupled to the one-wire serial bus. The method may be performed consistent with the timing diagram 800 for initiation of transactions. The process starts on interrupt detection by the host device. For interrupt detection, the host device may open an interrupt request window and then receive the interrupt request in the interrupt request window. The interrupt request window may be opened by driving the one-wire serial bus to a value, e.g., low or "0," and releasing the one-wire serial bus during a bus idle time, e.g., a clock pulse adjacent to a bus park pulse or a clock time after a bus park. The interrupt request is received by sampling the bus at a clock time after opening the interrupt request window and before closing the interrupt request window.

At 902, the host device challenges peripherals, e.g., subordinated devices, to drive the SDATA line, e.g., the one-wire serial bus, against the pending interrupt. As described above, there may be one or more, e.g., three, challenges driven on the SDATA line. This first sequence of challenge pulses is driven on the one-wire serial bus at each of a sequence of recurring clock times. Then the one-wire serial bus is released. In some aspects, this first sequence of challenge pulses is transmitted by driving the one-wire serial bus low at the start of a clock pulse and releasing the one-wire serial bus before the end of the clock pulse.

At 904, the host device determines whether a response is collected for each challenge. The host device, in one aspect, receives the second sequence, that is the sequence of challenge responses by sampling the one-wire serial bus after an interval following each recurring clock. If yes, then at 906, the host device determines whether all responses are in the affirmative. If yes, then the host device proceeds to the arbitration phase at 908.

If at 904, a response is not collected for each challenge, then at 910 the interrupt request is rejected. The interrupt request was spurious and not from a subordinate device. If at 906, all responses are not affirmative, then the interrupt is rejected as spurious at 910. The host device then re-starts an interrupt window, and the process returns to determine if there is a new interrupt detection.

Figure 10:
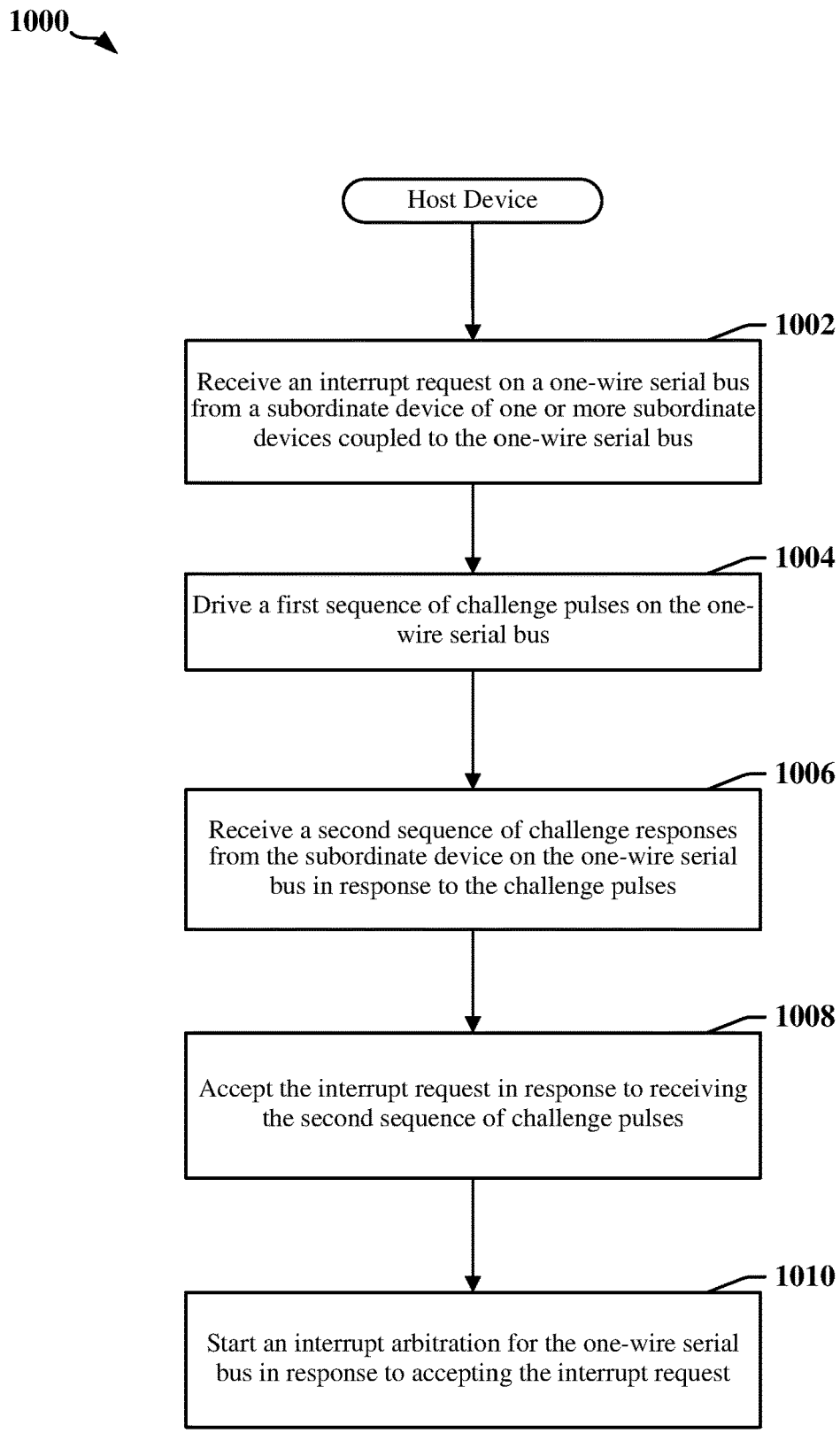
FIG. 10 is a second flowchart that illustrates a method for data communication at a host device in accordance with certain aspects disclosed herein.

FIG. 10 is a flowchart 1000 of a method of data communication that may be performed at a host device coupled to a one-wire serial bus. One or more subordinate devices may be coupled to the one-wire serial bus. At 1002, the host device receives an interrupt request on a one-wire serial bus from a subordinate device of one or more subordinate devices coupled to the one-wire serial bus. At 1004, the hot device drives a first sequence of challenge pulses on the one-wire serial bus. At 1006, the host device receives a second sequence of challenge responses from the subordinate device on the one-wire serial bus in response to the challenge pulses.

At 1008, the host device accepts the interrupt request in response to receiving the second sequence of challenge pulses, and at 1010, starts an interrupt arbitration for the one-wire serial bus in response to accepting the interrupt request.

Figure 11:
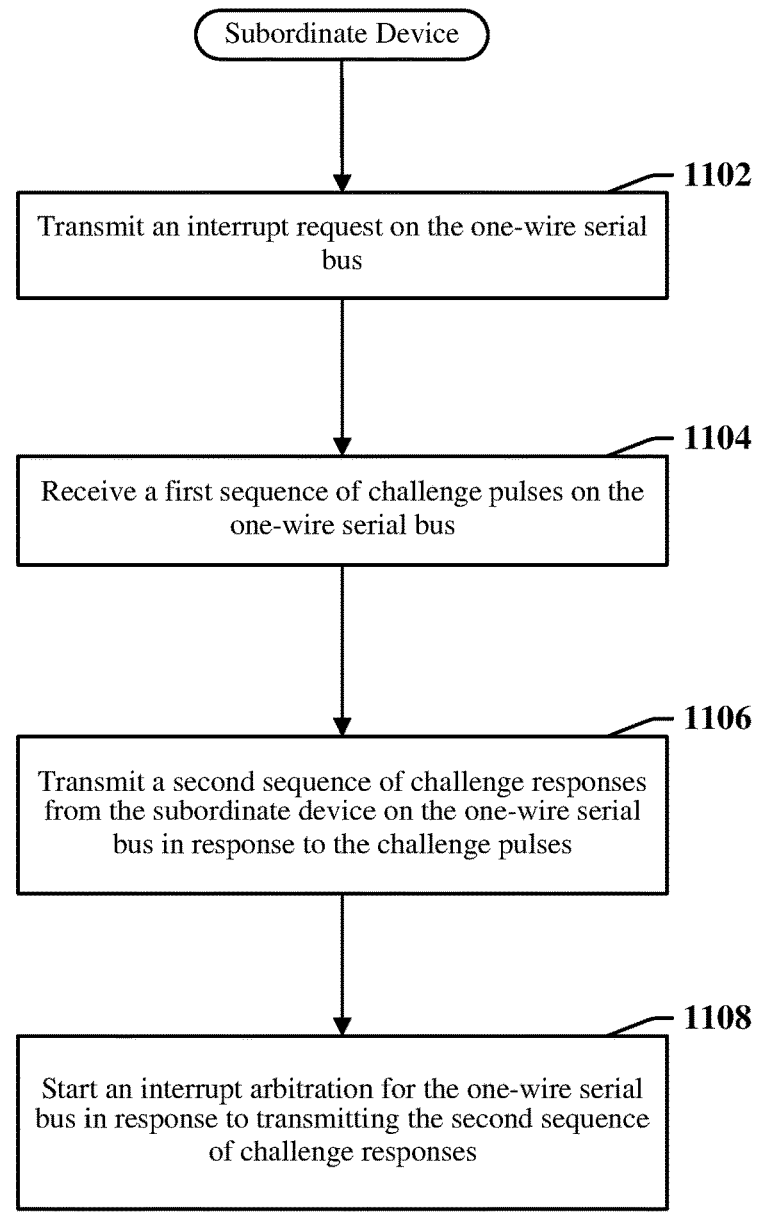
FIG. 11 is a third flowchart that illustrates a method for data communication at a bus subordinate device in accordance with certain aspects disclosed herein.

FIG. 11 is a flowchart 1100 of a method of data communication that may be performed at a subordinate device coupled to a one-wire serial bus. A host device and one or more additional subordinate devices may be coupled to the one-wire serial bus.

At 1102, the subordinate device transmits an interrupt request on the one-wire serial bus. The controller of the subordinate device may be configured to detect an open interrupt request window on the one-wire serial bus, and then transmit the interrupt request in the interrupt request window.

At 1104, the subordinate device receives a first sequence of challenge pulses on the one-wire serial bus, and at 1106 transmits a second sequence of challenge responses on the one-wire serial bus in response to the challenge pulses. This may be done by driving the one-wire serial bus to a second value after an interval following each recurring clock time of the respective challenge pulse.

At 1108, the subordinate device starts an interrupt arbitration for the one-wire serial bus in response to transmitting the second sequence of challenge responses. The interrupt arbitration may be performed by receiving a device address over the one-wire serial bus after transmitting the second sequence of challenge responses, receiving a high impedance at the one-wire serial bus after receiving the device address, and transmitting a pulse to the host device during a period comprising a configured number of cycles of the transmit clock signal.

Figure 12:
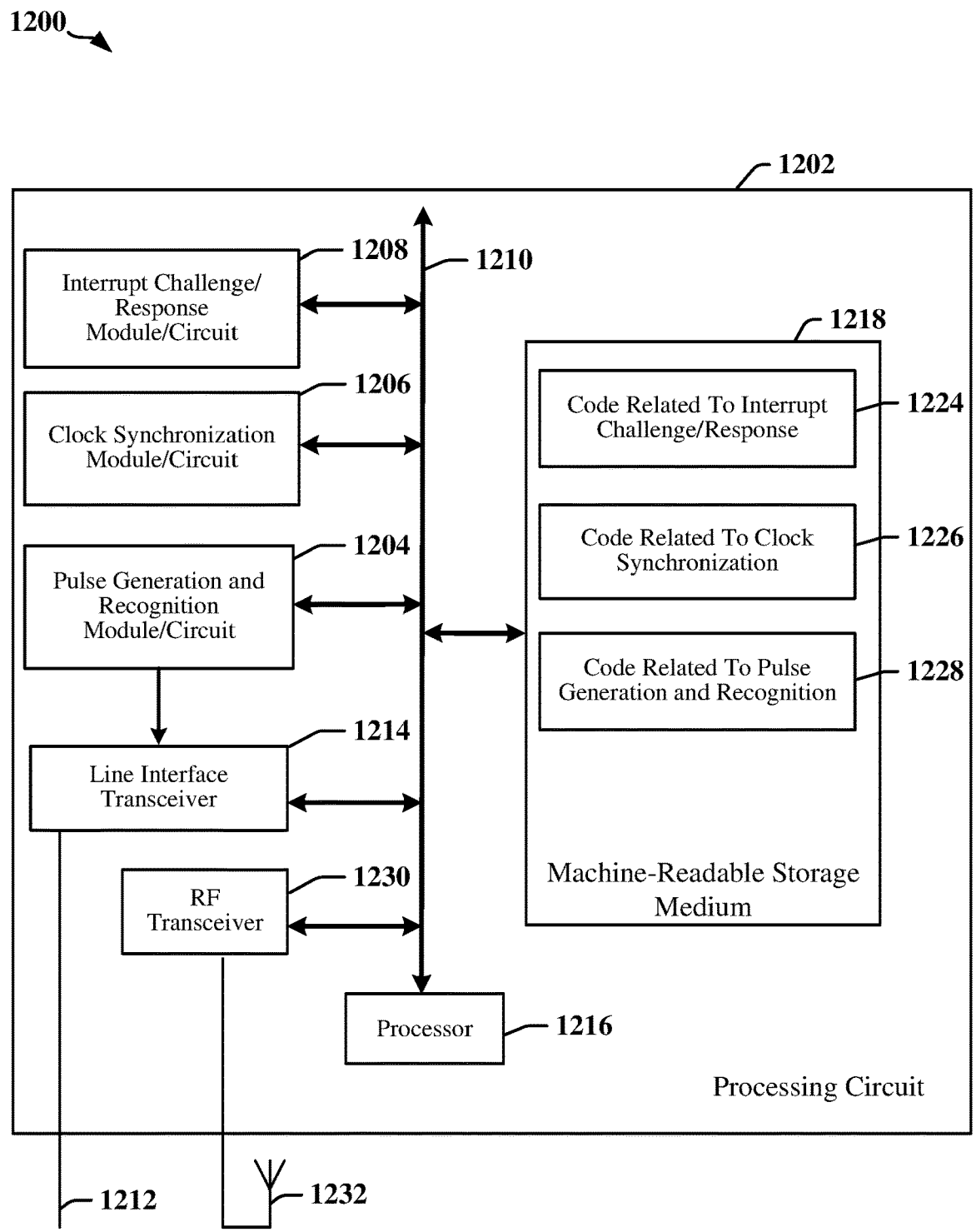
FIG. 12 illustrates an example of a hardware implementation for an apparatus adapted in accordance with certain aspects disclosed herein.

FIG. 12 is a diagram illustrating an example of a hardware implementation for an apparatus 1200 employing a processing circuit 1202. In some examples, the apparatus 1200 may perform one or more functions disclosed herein. In accordance with various aspects of the disclosure, an element, or any portion of an element, or any combination of elements as disclosed herein may be implemented using a processing circuit 1202. The processing circuit 1202 may include one or more processors 1216 that are controlled by some combination of hardware and software modules 1224, 1226, 1228. Examples of processors 1216 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1216 may include specialized processors that perform specific functions, and that may be configured, augmented, or controlled by one of the software modules 1224, 1226, 1228. The one or more processors 1216 may be configured through a combination of software modules 1224, 1226, 1228 loaded during initialization, and further configured by loading or unloading one or more software modules 1224, 1226, 1228 during operation. The processing circuit typically has a controller or processor 1216 that may include one or more microprocessors, microcontrollers, digital signal processors, sequencers and/or state machines.

The processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including one or more processors and/or hardware modules, represented by the controller or processor 1216, the modules or circuits 1204, 1206 and 1208 and the processor-readable storage medium 1218. One or more physical layer circuits and/or modules, including a line interface transceiver 1214 may be provided to support communication over a communication link implemented using a one-wire serial bus 1212. Another physical layer circuit and/or module may include an RF transceiver 1230 configured to communicate through an antenna or antenna array 1232 (to a radio access network for example), and so on. The bus 1210 may also link various other circuits such as timing sources, peripherals, voltage regulators, and power management circuits, which are well known in the art, and therefore, will not be described any further.

The processor 1216 is responsible for general processing, including the execution of software, code and/or instructions stored on a machine-readable storage medium 1218. The machine-readable storage medium 1218 may include a non-transitory storage medium. The processor 1216 may be responsible for managing the bus 1210 and for general processing that may include the execution of software stored in a machine-readable medium that may include digital storage. In this respect, the processing circuit 1202, including the processor 1216, may be used to implement any of the methods, functions and techniques disclosed herein. The machine-readable storage medium 1218 may be used for storing data that is manipulated by the processor 1216 when executing software, and the software may be configured to implement any one of the methods disclosed herein.

One or more processors 1216 of the processing circuit 1202 may be multifunctional, whereby some of the software modules 1224, 1226, 1228 are loaded and configured to perform different functions or different instances of the same function. The one or more processors 1216 may additionally be adapted to manage background tasks initiated in response to inputs from a user interface, the transceiver 1212a, 1212b, and device drivers, for example. To support the performance of multiple functions, the one or more processors 1216 may be configured to provide a multitasking environment, whereby each of a plurality of functions is implemented as a set of tasks serviced by the one or more processors 1216 as needed or desired. When a task has control of the one or more processors 1216, the processing circuit is effectively specialized for the purposes addressed by the function associated with the controlling task.

Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the machine-readable storage medium 1218 or in an external computer-readable medium.

The machine-readable storage medium 1218 and/or computer-readable storage may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The machine-readable storage medium 1218 and/or storage may also include, by way of example, a carrier wave, a transmission line, and any other suitable medium for transmitting software and/or instructions that may be accessed and read by a computer. machine-readable storage medium 1218 may reside in the processing circuit 1202, in the processor 1216, external to the processing circuit 1202, or be distributed across multiple entities including the processing circuit 1202. The machine-readable storage medium 1218 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The software, when executed by the processor 1216, causes the processing circuit 1202 to perform the various functions described herein, and for any particular apparatus.

The machine-readable storage medium 1218 may be used for storing data that is manipulated by the processor 1216 when executing software. The processing circuit 1202 further includes, one or more hardware modules coupled to the processor 1216, or some combination thereof. The modules 1204, 1206 and 1208 may include microcontroller instructions, state machine configuration parameters, circuits, processing cores, or some combination thereof.

The machine-readable storage medium 1218 may maintain software maintained and/or organized in loadable code segments, modules, applications, programs, etc., which may be referred to herein as software modules 1224, 1226, 1228. Each of the software modules 1224, 1226, 1228 may include instructions and data that, when installed or loaded on the processing circuit 1202 and executed by the one or more processors 1216, contribute to a run-time image that controls the operation of the one or more processors 1216. When executed, certain instructions may cause the processing circuit 1202 to perform functions in accordance with certain methods, algorithms and processes described herein.

Some of the software modules 1224, 1226, 1228 may be loaded during initialization of the processing circuit 1202, and these software modules 1224, 1226, 1228 may configure the processing circuit 1202 to enable performance of the various functions disclosed herein. For example, some software modules 1224, 1226, 1228 may configure internal devices and/or modules 1204, 1206, 1208 of the processor 1216, and may manage access to external devices such as the line interface transceiver 1214, the RF transceiver 1230, a bus interface, a user interface, timers, mathematical coprocessors, and so on. The software modules 1224, 1226, 1228 may include a control program and/or an operating system that interacts with interrupt handlers and device drivers, and that controls access to various resources provided by the processing circuit 1202. The resources may include memory, processing time, access to a transceiver, the user interface, and so on.

In one configuration, the apparatus 1200 includes pulse recognition and generation modules and/or circuits 1204 adapted to generate and recognize different pulses including bus park, interrupt window open and close, interrupt request, interrupt challenge, interrupt response, address arbitration, data, and synchronization pulses. The apparatus 1200 includes clock synchronization circuits and/or modules 1206 adapted to synchronize an internal clock signal based on synchronization pulses and transitions in data or commands. The apparatus 1200 includes interrupt challenge/response modules and/or circuits 1208 adapted to accept an interrupt request in response to receiving a sequence of challenge responses, start an interrupt arbitration in response to accepting the interrupt request.

In one example, the apparatus 1200 includes physical layer circuits and/or modules 1214 that implement an interface circuit with at least one line driver adapted or configured to couple the apparatus 1200 to a one-wire serial bus. The apparatus 1200 may have a processor 1216 or protocol controller.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor and the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: A host device configured for data communication, the host device, comprising: a line driver configured to couple the host device to a one-wire serial bus; and a controller configured to: receive an interrupt request on the one-wire serial bus from a subordinate device of one or more subordinate devices coupled to the one-wire serial bus; drive a first sequence of challenge pulses on the one-wire serial bus; receive a second sequence of challenge responses from the subordinate device on the one-wire serial bus in response to the challenge pulses; accept the interrupt request in response to receiving the second sequence of challenge responses; and start an interrupt arbitration for the one-wire serial bus in response to accepting the interrupt request.

Example 2: The host device of example 1, wherein the controller is configured to drive the first sequence of challenge pulses by driving the one-wire serial bus to a value at each of a sequence of recurring clock times and releasing the one-wire serial bus.

Example 3: The host device of example 1 or 2, wherein the controller is configured to receive the second sequence of challenge responses by sampling the one-wire serial bus after an interval following each recurring clock time.

Example 4: The host device of example 3, wherein the controller is configured to sample the one-wire serial bus after the interval by sampling the one-wire serial bus at an end of a next clock pulse after the respective challenge pulse.

Example 5. A method of data communication performed at a host device, comprising: receiving an interrupt request on a one-wire serial bus from a subordinate device of one or more subordinate devices coupled to the one-wire serial bus; driving a first sequence of challenge pulses on the one-wire serial bus; receiving a second sequence of challenge responses from the subordinate device on the one-wire serial bus in response to the challenge pulses; accepting the interrupt request in response to receiving the second sequence of challenge responses; and starting an interrupt arbitration for the one-wire serial bus in response to accepting the interrupt request.

Example 6: The method of example 5, further comprising opening an interrupt request window, wherein receiving the interrupt request comprises receiving the interrupt request in the interrupt request window.

Example 7: The method of example 6, wherein opening an interrupt request window comprises driving the one-wire serial bus to a value and releasing the one-wire serial bus.

Example 8: The method of example 6 or 7, wherein opening the interrupt request window comprises opening the interrupt request window during a one-wire serial bus idle time.

Example 9: The method of any one or more of examples 5-7, wherein receiving the interrupt request comprises sampling the one-wire serial bus at a clock time.

Example 10: The method of example 9, wherein the clock time comprises a time after a bus park.

Example 11: The method of any one or more of examples 5-10, wherein the first sequence of challenge pulses comprises three challenge pulses.

Example 12: The method of any one or more of examples 5-11, further comprising rejecting the interrupt request in response to not receiving each challenge response of the second sequence of challenge responses.

Example 13: The method of any one or more of examples 5-12, wherein driving a first sequence of challenge pulses comprises driving the one-wire serial bus low at the start of a clock pulse and releasing the one-wire serial bus before the end of the clock pulse.

Example 14: The method of any one or more of examples 5-13, further comprising transmitting a plurality of synchronization pulses over the one-wire serial bus after a sequence start condition (SSC) has been transmitted over the one-wire serial bus, the plurality of synchronization pulses being configured to synchronize one or more subordinate devices coupled to the one-wire serial bus.

Example 15. The method of any one or more of examples 5-14, wherein starting an interrupt arbitration comprises: transmitting a device address over the one-wire serial bus after receiving the sequence of challenge responses; presenting a high impedance to the one-wire serial bus after transmitting the device address; and determining that a subordinate device associated with the device address is requesting interrupt service when a pulse is received from the one-wire serial bus during a period comprising a configured number of cycles of the transmit clock signal.

Example 16. The method of any one or more of examples 5-15, further comprising performing a read transaction or a write transaction after the interrupt request arbitration in accordance with a Radio Frequency Front-End (RFFE) protocol.

Example 17. A subordinate device configured for data communication, the subordinate device, comprising: a line driver configured to couple the subordinate device to a one-wire serial bus, the one-wire serial bus coupled to a host device and one or more other subordinate devices; and a controller configured to: transmit an interrupt request on the one-wire serial bus from the subordinate device; receive a first sequence of challenge pulses on the one-wire serial bus;

transmit a second sequence of challenge responses from the subordinate device on the one-wire serial bus in response to the challenge pulses; and start an interrupt arbitration for the one-wire serial bus in response to transmitting the second sequence of challenge responses.

Example 18: The subordinate device of example 17, wherein the controller is further configured to detect an open interrupt request window on the one-wire serial bus, and wherein transmitting an interrupt request comprises transmitting the interrupt request in the interrupt request window from the subordinate device;

Example 19: The subordinate device of example 17 or 18, wherein the controller is configured to send the second sequence of challenge responses by driving the one-wire serial bus to a second value after an interval following each recurring clock time.

Example 20: The subordinate device of example 19, wherein the controller is configured to start an interrupt arbitration by: receiving a device address over the one-wire serial bus after transmitting the second sequence of challenge responses; receiving a high impedance at the one-wire serial bus after receiving the device address; and transmitting a pulse to the host device during a period comprising a configured number of cycles of the transmit clock signal.

What is claimed is:

1. A host device configured for data communication, the host device, comprising:
    a line driver configured to couple the host device to a one-wire serial bus; and
    a controller configured to:
        receive an interrupt request on the one-wire serial bus from a subordinate device of one or more subordinate devices coupled to the one-wire serial bus;
        drive a first sequence of challenge pulses on the one-wire serial bus;
        receive a second sequence of challenge responses from the subordinate device on the one-wire serial bus in response to the challenge pulses;
        accept the interrupt request in response to receiving the second sequence of challenge responses; and
        start an interrupt arbitration for the one-wire serial bus in response to accepting the interrupt request.

2. The host device of claim 1, wherein the controller is configured to drive the first sequence of challenge pulses by driving the one-wire serial bus to a value at each of a sequence of recurring clock times and releasing the one-wire serial bus.

3. The host device of claim 1, wherein the controller is configured to receive the second sequence of challenge responses by sampling the one-wire serial bus after an interval following each recurring clock time.

4. The host device of claim 3, wherein the controller is configured to sample the one-wire serial bus after the interval by sampling the one-wire serial bus at an end of a next clock pulse after the respective challenge pulse.

5. A method of data communication performed at a host device, comprising:
    receiving an interrupt request on a one-wire serial bus from a subordinate device of one or more subordinate devices coupled to the one-wire serial bus;
    driving a first sequence of challenge pulses on the one-wire serial bus;
    receiving a second sequence of challenge responses from the subordinate device on the one-wire serial bus in response to the challenge pulses;
    accepting the interrupt request in response to receiving the second sequence of challenge responses; and
    starting an interrupt arbitration for the one-wire serial bus in response to accepting the interrupt request.

6. The method of claim 5, further comprising opening an interrupt request window, wherein receiving the interrupt request comprises receiving the interrupt request in the interrupt request window.

7. The method of claim 6, wherein opening an interrupt request window comprises driving the one-wire serial bus to a value and releasing the one-wire serial bus.

8. The method of claim 6, wherein opening the interrupt request window comprises opening the interrupt request window during a one-wire serial bus idle time.

9. The method of claim 5, wherein receiving the interrupt request comprises sampling the one-wire serial bus at a clock time.

10. The method of claim 9, wherein the clock time comprises a time after a bus park.

11. The method of claim 5, wherein the first sequence of challenge pulses comprises three challenge pulses.

12. The method of claim 5, further comprising rejecting the interrupt request in response to not receiving each challenge response of the second sequence of challenge responses.

13. The method of claim 5, wherein driving a first sequence of challenge pulses comprises driving the one-wire serial bus low at the start of a clock pulse and releasing the one-wire serial bus before the end of the clock pulse.

14. The method of claim 5, further comprising transmitting a plurality of synchronization pulses over the one-wire serial bus after a sequence start condition (SSC) has been transmitted over the one-wire serial bus, the plurality of synchronization pulses being configured to synchronize one or more subordinate devices coupled to the one-wire serial bus.

15. The method of claim 5, wherein starting an interrupt arbitration comprises:
    transmitting a device address over the one-wire serial bus after receiving the sequence of challenge responses;
    presenting a high impedance to the one-wire serial bus after transmitting the device address; and
    determining that a subordinate device associated with the device address is requesting interrupt service when a pulse is received from the one-wire serial bus during a period comprising a configured number of cycles of the transmit clock signal.

16. The method of claim 5, further comprising performing a read transaction or a write transaction after the interrupt request arbitration in accordance with a Radio Frequency Front-End (RFFE) protocol.

17. A subordinate device configured for data communication, the subordinate device, comprising:
    a line driver configured to couple the subordinate device to a one-wire serial bus, the one-wire serial bus coupled to a host device and one or more other subordinate devices; and
    a controller configured to:
        transmit an interrupt request on the one-wire serial bus from the subordinate device;
        receive a first sequence of challenge pulses on the one-wire serial bus;
        transmit a second sequence of challenge responses from the subordinate device on the one-wire serial bus in response to the challenge pulses; and
        start an interrupt arbitration for the one-wire serial bus in response to transmitting the second sequence of challenge responses.

18. The subordinate device of claim 17, wherein the controller is further configured to detect an open interrupt request window on the one-wire serial bus, and wherein transmitting an interrupt request comprises transmitting the interrupt request in the interrupt request window from the subordinate device.

19. The subordinate device of claim 17, wherein the controller is configured to send the second sequence of challenge responses by driving the one-wire serial bus to a second value after an interval following each recurring clock time.

20. The subordinate device of claim 19, wherein the controller is configured to start an interrupt arbitration by:
receiving a device address over the one-wire serial bus after transmitting the second sequence of challenge responses;
receiving a high impedance at the one-wire serial bus after receiving the device address; and
transmitting a pulse to the host device during a period comprising a configured number of cycles of the transmit clock signal.

\* \* \* \* \*